(12) United States Patent
Gansohr et al.

(10) Patent No.: US 8,366,588 B2
(45) Date of Patent: Feb. 5, 2013

(54) METHOD AND DEVICE FOR CONTROLLING A MOTOR VEHICLE DRIVE TRAIN

(75) Inventors: Marcus Gansohr, Salem (DE); Florian Schneider, Lindenberg (DE); Thomas Jäger, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1409 days.

(21) Appl. No.: 11/908,661

(22) PCT Filed: Mar. 15, 2006

(86) PCT No.: PCT/EP2006/002389
§ 371 (c)(1),
(2), (4) Date: Jan. 29, 2008

(87) PCT Pub. No.: WO2006/097297
PCT Pub. Date: Sep. 21, 2006

(65) Prior Publication Data
US 2008/0171633 A1    Jul. 17, 2008

(30) Foreign Application Priority Data
Mar. 17, 2005    (DE) .......................... 10 2005 012 261

(51) Int. Cl.
*F16H 61/20* (2006.01)
*G06F 7/00* (2006.01)
*G06F 17/00* (2006.01)
*G06F 19/00* (2011.01)
*B60W 10/02* (2006.01)
*B60W 10/10* (2012.01)
*F16D 67/00* (2006.01)

(52) U.S. Cl. .......... 477/114; 477/906; 701/62; 192/3.58
(58) Field of Classification Search ................ 192/3.57, 192/3.58, 103 F, 3.63; 74/335; 477/79, 114, 477/174, 177, 180, 906, 169, 168, 175; 701/76, 701/67
See application file for complete search history.

(56) References Cited

U.S. PATENT DOCUMENTS 4,955,255 A * 9/1990 Yamaashi et al. ............... 477/94
4,965,730 A * 10/1990 Kurihara et al. .............. 701/112
(Continued)

FOREIGN PATENT DOCUMENTS
AU    2003233943 A1    10/2003
DE    4235364 A1    4/1994
(Continued)

*Primary Examiner* — Troy Chambers
*Assistant Examiner* — Michael Gonzalez
(74) *Attorney, Agent, or Firm* — Davis & Bujold, PLLC

(57) ABSTRACT

A method for controlling a drivetrain including an automatically shifted starting clutch and gear-shift clutch and a transmission, with a non self-locking clutch actuator, a gear actuator for engaging and disengaging transmission gears and a control unit which generates control commands for the clutch actuator and gear actuator and transmits such commands to the actuators such that, when the vehicle is at rest and a gear is engaged and if the clutch actuator fails, the clutch does not inadvertently engage. When a transmission gear is engaged, a control command is generated and sent for the clutch actuator to disengage the clutch. Thereafter, the vehicle speed is determined and if the speed is essentially zero and the clutch begins to engage, a control command is sent to the gear actuator to shift the transmission to its neutral position.

16 Claims, 1 Drawing Sheet

U.S. PATENT DOCUMENTS

| | | | |
|---|---|---|---|
| 5,103,692 A * | 4/1992 | Shimanaka et al. | 477/109 |
| 5,315,972 A * | 5/1994 | Judy et al. | 123/198 D |
| 5,847,272 A * | 12/1998 | Schneider et al. | 73/115.02 |
| 5,921,885 A * | 7/1999 | Tabata et al. | 477/107 |
| 5,928,110 A * | 7/1999 | Vornehm et al. | 477/166 |
| 6,029,784 A | 2/2000 | Grass et al. | |
| 6,139,468 A * | 10/2000 | Goates et al. | 477/97 |
| 6,223,873 B1 * | 5/2001 | Ahnert et al. | 192/3.56 |
| 6,357,289 B1 * | 3/2002 | Futawatari | 73/115.02 |
| 6,393,357 B1 | 5/2002 | Holmes et al. | |
| 6,424,903 B1 * | 7/2002 | Amisano et al. | 701/67 |
| 6,547,699 B2 * | 4/2003 | Eich et al. | 477/175 |
| 6,752,743 B2 * | 6/2004 | Eich et al. | 477/175 |
| 6,849,027 B2 * | 2/2005 | Eich et al. | 477/34 |
| 6,953,417 B2 * | 10/2005 | Koenig | 477/181 |
| 7,003,429 B2 | 2/2006 | Gansohr et al. | |
| 7,008,349 B2 * | 3/2006 | Zimmermann et al. | 477/107 |
| 7,204,085 B2 * | 4/2007 | Bright et al. | 60/423 |
| 7,938,750 B2 * | 5/2011 | Langer et al. | 477/115 |
| 2003/0130092 A1 | 7/2003 | Eich et al. | |
| 2004/0045784 A1 | 3/2004 | Ebert et al. | |
| 2004/0106495 A1 | 6/2004 | Abusamra et al. | |
| 2005/0023102 A1 * | 2/2005 | Brissenden et al. | 192/85 R |
| 2005/0033552 A1 | 2/2005 | Gansohr et al. | |
| 2006/0155435 A1 * | 7/2006 | Dell et al. | 701/22 |

FOREIGN PATENT DOCUMENTS

| | | |
|---|---|---|
| DE | 19641074 A1 | 4/1998 |
| DE | 19745675 C1 | 5/1999 |
| DE | 19849488 A1 | 5/2000 |
| DE | 19926697 A1 | 12/2000 |
| DE | 10129421 A1 | 1/2002 |
| DE | 10201980 A1 | 8/2002 |
| DE | 10231783 A1 | 3/2003 |
| DE | 10161742 A1 | 6/2003 |
| DE | 10316419 A1 | 11/2003 |
| JP | 02-006234 | 1/1990 |
| WO | 00/52351 A1 | 9/2000 |

* cited by examiner

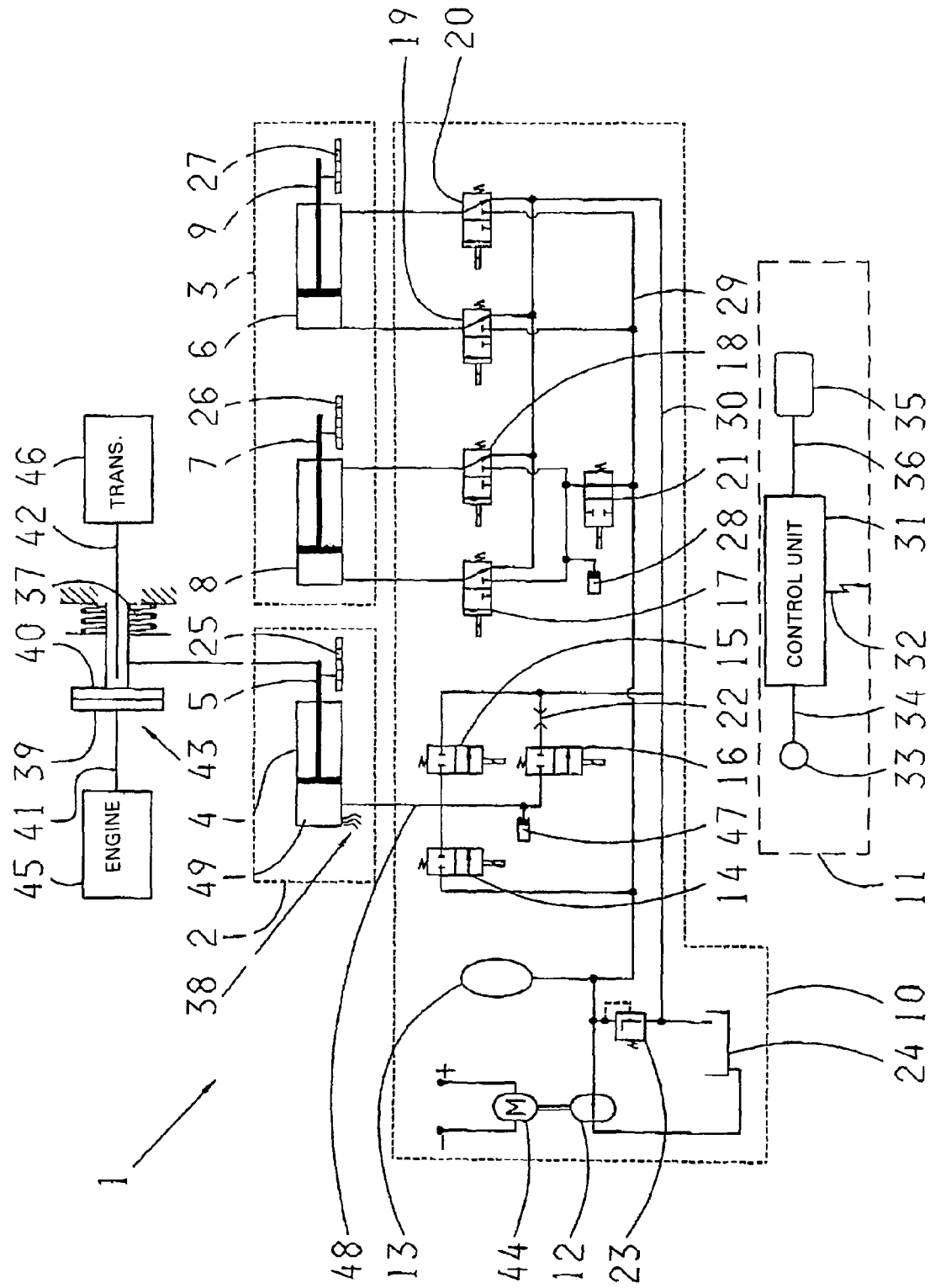

METHOD AND DEVICE FOR CONTROLLING A MOTOR VEHICLE DRIVE TRAIN

This application is a National Stage completion of PCT/EP2006/002389 filed Mar. 15, 2006, which in turn claims priority from German patent application serial no. 10 2005 012 261.2 filed Mar. 17, 2005.

FIELD OF THE INVENTION

The invention concerns a method and device for controlling a motor vehicle drivetrain with an automatic gear-shift transmission and an automated starting and gear-shift clutch.

BACKGROUND OF THE INVENTION

As is known, a motor vehicle drivetrain comprises a starting and gear-shift clutch between a drive engine and a transmission. Particularly in the case of drivetrains with automatically shifting transmissions, the starting and gear-shift clutch is usually also made to be actuated automatically, so that a driver of the vehicle is largely relieved of the need to actuate the gear shifts and the clutch. To actuate such a clutch, an actuator that can be controlled by a control unit is used, which in most applications is actuated by a pressure medium but can also be made to be actuated electrically.

Pressure-medium-actuated clutch actuators consist, in the simplest case, of a cylinder in which a piston is fitted and able to move axially. The piston is connected by a piston rod to a clutch element which, when moved axially, keeps the friction linings of the clutch separated against the restoring force of springs or brings them together, thereby engaging or disengaging the clutch. In relation to this axial movement, the clutch actuator is not made self-locking, so if there is a pressure drop its piston allows the clutch to move back to its starting position, thereby engaging it.

To actuate pressure-medium-actuated clutch actuators, electromagnetic switching valves are usually used, which can be controlled by a control unit on the basis of information from sensors and control programs. Depending on their switch position these switching valves provide, for at least one pressure space of the clutch actuation cylinder, a pressure medium connection to a pressure delivery line, the seal the cylinder space relative to the outside, or enable it to be drained into a pressure medium tank. By virtue of these control functions the piston of the clutch actuation cylinder is axially displaced or maintained in a particular position, so that the starting and gear-shift clutch can be disengaged, engaged or operated in slipping mode.

As is known from DE 101 61 742 A1, certain hydraulic, electro-hydraulic or electric components of a motor vehicle even such as switching valves and adjusting motors are, for reasons of cost among others, not designed to last for very long times, so that to avoid damaging such components a maximum permissible duration of operation within a reference time period should not be exceeded.

Now, if a switching valve for a clutch actuation cylinder or a pressure medium line that connects this switching valve to the clutch actuation cylinder has a leak, in order to open the clutch, and depending on the size of the leak, the switching valve must be actuated until the control unit has determined, on the basis of sensor information, that the clutch has disengaged to the desired extent, whereupon it transmits an engaging command or at any rate no further disengaging commands to the switching valve in question. If the leak is comparatively large this can result with the switching valve remaining actuated for a very long time in order to keep the clutch disengaged. Such a long an actuation time can be damaging for the life of the switching valve and may even lead to its sudden failure. In addition, situations must be avoided in which, for example, when a gear is engaged and the starting and gear-shift clutch is disengaged, a leak results in the undesired driving circumstance that the clutch engages inadvertently because of the leak.

This operating behavior of the starting and gear-shift clutch can also occur with clutch actuators which are not actuated by pressure medium and therefore have no switching valves. For example, in the case of a clutch actuator based on a spindle drive powered by an electric motor and not designed to be self-locking, it must be ensured that if a component fails or if the electric voltage supply is briefly interrupted, for example because of a loose contact, no driving situation arises in which the starting and gear-shift clutch engages inadvertently while a gear is engaged.

SUMMARY OF THE INVENTION

With this as a background, the purpose of the present invention is to propose a method and device with which the above problems can be solved. In particular, the possibility should be prevented that if there is a leak in a pressure line leading to a clutch actuator which, in relation to its actuation movement, is not of self-locking design, in the actuator itself, or in a clutch switching valve associated therewith, the component fails because it is sometimes required to operate for long periods and the clutch engages inadvertently. If the non self-locking clutch actuator is made to be actuated electrically, then in the event of a drive component failure or if the electric voltage supply is interrupted, no driving situation must arise such that the starting and gear-shift clutch engages inadvertently.

The invention is based on the realization that the objective is achieved if the fault is detected by a control unit, which then generates and emits a switching command to a transmission actuator which ensures that the transmission is shifted to its neutral position, in which it can transmit no torque. This measure ensures that engaging of the starting and gear-shift clutch as a result of a fault does not lead to an undesired driving situation.

Thus the invention concerns in the first place a method for controlling a drivetrain with an automatically actuated starting and gear-shift clutch and an automatic transmission, with a clutch actuator not designed to be self-locking in relation to its actuation movement, with a gear actuator for engaging and disengaging transmission gears, and with a control unit which, with the aid of information received from sensors and control programs, generates control commands for the clutch actuator and the gear actuator and sends them to the actuators. To achieve the stated objective the following process steps are envisaged:

a) when a gear is engaged, a control command is generated and sent to at least one actuating means for the clutch actuator to disengage the clutch,
b) the speed of the vehicle is determined,
c) when the vehicle speed is zero or nearly so and the beginning of an undesired clutch engagement is detected, a control command is generated and sent to at least one actuation means of the gear actuator to shift the transmission to its neutral position.

These measures reliably ensure that after some event such as a short interruption of the electric voltage supply to an electro-mechanical clutch actuator, or for example if there is a leak in a pressure medium line leading to a clutch actuator which is actuated by a pressure medium, inadvertent engagement of the starting and gear-shift clutch does not lead to an undesired vehicle operating situation, such as undesired starting thereof. In addition this operating behavior ensures that the clutch actuator actuating means are not damaged by an otherwise excessively long period of operation According to a particular embodiment variant of this method it is provided that an undesired engagement of the clutch due to abnormal operation of the actuation means for the clutch actuator, the clutch actuator itself and/or due to a leak, is detected by determining the actuation duration of the actuation means.

In addition, in this connection it can be provided that the actuation duration determined for the actuation means of the clutch actuator, is compared with a predetermined maximum value of the actuation duration, and if this maximum value is exceeded, it can be concluded that there is a defective function of the actuation means, the clutch actuator and/or that there is a leak in a pressure line connected to the clutch actuator or in the clutch actuator itself. It is understood that a defective function of the actuation means for the clutch actuator also includes a disturbance of the voltage supply to an electric motor for an electro-mechanical or electromagnetic clutch actuator.

According to a further aspect of the invention, the process step (c) is only carried out when a maximum actuation duration of the actuation means for the clutch actuator for disengaging the clutch is exceeded within a specified time period.

To determine the actuation duration of the actuation means, the time for which it has been active can be measured or estimated, or its active time intervals can be summed. Suitable ways of doing this are known from DE 101 61 742 A1.

In particular, in this connection it can be provided to measure the actuation duration of an electro-hydraulic or electro-pneumatic switching valve through which the clutch actuator can be supplied with a pressure medium pressure that disengages the clutch.

In the case when the clutch actuator is made as an electric motor which, for example, drives a positioning spindle of an electro-mechanical clutch actuator, the actuation duration of this electric motor can be determined.

In another embodiment of the method according to the invention, the beginning of the undesired engagement of the starting and gear-shift clutch is detected by measuring the movement path of the moving portion of the clutch actuator.

According to another variant, however, the beginning of the undesired engagement of the clutch is detected by measuring a pressure drop compared with a nominal pressure in a pressure space of the clutch actuator that can be actuated by a pressure medium, or in a line leading to the pressure space.

In particular, in this connection it can be provided that the process step (c) is only carried out if, when the switching valves which block a line that delivers pressure medium pressure to the clutch actuation cylinder or its pressure space are closed, the pressure therein falls below a specified nominal pressure value.

The invention also concerns a device for controlling a drivetrain with an automatically engaged starting and gear-shift clutch and an automatic transmission, with a clutch actuator not designed to be self-locking in relation to its actuating movement, with a gear actuator for engaging and disengaging transmission gears, and with a control unit which, with the aid of information received from sensors and control programs, generates control commands for the at least one clutch actuator and the gear actuator and sends them to the actuators.

According to the invention this device also comprises means for determining the beginning of an undesired engaging movement of the clutch actuator when a gear is engaged, the means being designed to co-operate with the control unit in such manner that when the speed of the vehicle is zero or nearly so, the control unit can act upon actuation means for the gear actuator so that the transmission can be shifted to its neutral setting.

A further development of this device provides that the at least one means for determining the beginning of an undesired engaging movement of the clutch actuator consist of a pressure sensor in the area of the clutch actuation cylinder of a clutch actuator, a path sensor and/or a device which determines active time.

According to the invention, the pressure sensor is arranged in the pressure space of the clutch actuation cylinder or in the pressure line leading thereto.

In a preferred variant this pressure line is arranged between two electro-mechanical switching valves by means of which the pressure space of the clutch actuation cylinder can be filled with pressure medium or drained of pressure medium.

BRIEF DESCRIPTION OF THE DRAWINGS

Below, the invention is explained in more detail with reference to a drawing in which:

FIG. 1 is a schematic view of an embodiment of the invention.

DETAILED DESCRIPTION OF THE PREFERRED EMBODIMENT

The single FIGURE shows at the top a drivetrain of a motor vehicle, with an internal combustion engine 45, an automatically actuated starting and gear-shift clutch 43 and an automatic transmission 46. In this known structure the crankshaft 41 of the combustion engine 45 is connected in a rotationally fixed manner with the input side 39 of the clutch 43, while the output side 40 of the clutch 43 is connected in a rotationally fixed manner to the transmission input shaft 42 of the automatic transmission 46. In addition, the output side 40 of the clutch is made axially movable relative to its input side 39, and a clutch-engagement spring 37 engages the clutch 43 without being actuated. Furthermore, the output side 40 of the clutch 43 is acted upon by a clutch actuator 4 by means of which the clutch 43 can be disengaged against the restoring force of the clutch-engagement spring 37.

FIG. 1 also shows a control scheme 1 of a hydraulic control device, according to the invention for the above-mentioned starting and gear-shift clutch 43 and for the automatic transmission 46, which is divided into four functional blocks.

The first functional block 2 is formed by the already mentioned actuator 4 for the starting and gear-shift clutch 43. In this case the actuator 4 is made as a hydraulic clutch actuation cylinder 4 with a simple and not self-locking action, whose piston 5 can act against the restoring force of the clutch-engagement spring 37. The clutch-engagement spring 37 ensures that, in a manner known as such, the clutch 43 is engaged unless it is actuated. The piston rod 5 of the clutch actuator 4, in a concrete, mounted situation in a motor vehicle, is in active connection with a disengaging fork (not shown here) of a clutch-disengaging mechanism.

The movement path of the piston rod 5 is determined by a path sensor 25 and transmitted to a control unit 31, so that the movement of the piston rod 5 can be controlled or regulated as necessary. The control unit 31 is in signal-exchange connection with the relevant sensors and actuators via sensor paths or control paths 32.

The second functional block 3 of this control scheme 1 is formed by two dual-action hydraulic actuators for actuating the transmission. Here, a transmission actuator is made as a gate operating cylinder 6 whose piston separates two pressure spaces within the operating cylinder 6 from one another in a pressure-tight way. The piston rod 9 emerging from the operating cylinder 6 is connected to a transmission actuating device and serves for the selective choice of shift gates. A path sensor 27 communicates to the control unit 31 the exact position of the piston rod 9.

The second hydraulic transmission actuator 8 is constructed in the same way as the first transmission actuator 6, but in this case serves to engage and disengage transmission gears. For that purpose its piston rod 7 is connected to a related transmission actuation device. The position of this piston rod 7 is detected by a path sensor 26 and transmitted to the control unit 31.

The third functional block 10 of the control scheme 1 comprises the hydraulic control system for the operating cylinders 4, 6 and 8, the clutch 43 and the transmission 46. Its structure and mode of operation will be described below.

The fourth functional block 11 is formed by the control unit 31 and other components. These include a speed sensor 33 connected to the control unit 31 by a sensor lead 34, which serves to detect the speed of the vehicle. FIG. 1 also shows a device 35 for determining the active time, connected to the control device 31 by a data lead 36. However, the active time determination device 35 can also be an integral part of the control unit 31 and can be operated in the manner already known from the document DE 101 61 742 A1 mentioned earlier. The control and sensor leads 32 represented in FIG. 1 as a lightning symbol connect to the respective sensors and switching valves, but wireless signal transmission paths are also conceivable.

The hydraulic control system in the functional block 10 comprises, first, pressure generation, pressure storage and pressure medium line components known as such. These include an electric motor 44 that drives a pressure medium pump 12, a pressure reservoir 13, pressure lines 29 leading to the operating cylinders 4, 6 and 8, and unpressurized or drainage lines 30 leading away from them, a pressure-limiting valve 23 between the two lines 29 and 30, and a pressure medium tank 24 into which the drainage line 29 opens and from which the pump 12 draws the pressure medium.

To effect the actuation movement of its piston, the clutch actuation cylinder 4 is associated with three electromagnetic 2/2-way valves 14, 15 and 16. In the switch position shown all these associated switching valves 14, 15 and 16 are closed, so that a definite volume of pressure medium from a previous valve switching process is enclosed at a definite pressure in the single pressure space 49 of the clutch operating cylinder 4. In this case the piston rod 5 is shown in a position in which the starting and gear-shift clutch 43 is engaged.

To disengage the clutch 43, the switching valve 14 is brought to its open position so that more of the pressure medium can pass into the pressure space 49 of the clutch operating cylinder 4 through the line 29. With the switching valves 15 and 16 still closed, the piston and piston rod 5 move to the right against the force of the clutch-engagement spring 37 and the clutch 43 disengages. Now the switching valve 14 is closed again, so that the pressure of the pressure medium enclosed in the pressure space 49 of the clutch operating cylinder 4 keeps the clutch disengaged.

If the clutch 43 is then to be engaged again, the switching valve 14 is still kept closed and the switching valve 15 is opened. This allows pressure medium to flow out of the pressure space 49 of the clutch operating cylinder 4 into the drainage line 30, whereupon the clutch-engagement spring 37 brings about the restoring movement of the piston and piston rod 5.

With the aid of the switching valve 16 and the throttle 22 arranged downstream from it, the engagement of the starting and gear-shift clutch 43 can take place more comfortably than with the switching valve 15. It is preferably used to engage the clutch during starting processes.

The switching valves 17 to 20 associated with the transmission operating cylinders 6 and 8 are made as 3/2-way valves, which can also be actuated electromagnetically on the basis of control commands from the control unit 31. With these valves 17 to 20 the two pressure spaces of the respective operating cylinders 6, 8 are connected alternatively to the pressure line 29 or the drainage line 30.

By virtue of its two possible switch positions in combination with a pressure sensor 28, a further electromagnetically actuated 2/2-way valve 21 makes it possible, when the switching valves 17, 18 and 21 are in appropriate switch positions, for the pressure medium pressure in the right- or left-hand pressure space of the gear-operating cylinder 8 or in the pressure line 29 to be measured, and for the pressure medium pressure to be maintained in one of the two pressure spaces of the gear-operating cylinder 8.

In the case of such a control device or one similar to it, the normal operating sequence in the area of the clutch control can be disturbed if a leak 38 occurs from the clutch actuation cylinder 4 or the line leading to it. If the leak 38 exceeds a certain volume flow per unit time, when the clutch 43 is disengaged, even with the valves 15 and 16 closed and the valve 14 open, although pressure medium passes into the pressure space 49 of the clutch operating cylinder 4, at the same time the disengagement time or sum of partial disengaging times that suffices for the normal operation of the switching valve 14 will not be enough to compensate for the pressure medium loss through the leakage point 38.

Now, when an operating situation arises in which the vehicle is at rest and a gear is engaged, it must always be guaranteed that a disengaged clutch 43 remains disengaged, because otherwise the vehicle would start off on its own without the driver wanting or expecting that to happen. In such a case the control unit 31 would therefore continue actuating the switching valve 14 in its operating direction, but this could lead to overheating and subsequent damage thereof.

To avoid this, in one variant of the method according to the invention the actual active time of the switching valve 14 is determined, the active time is compared with a stored maximum value of the switched-on time, and when the maximum value has been exceeded, the transmission 46 is brought to its neutral position. This procedure, on the one hand, ensures that the switching valve 14 for admitting pressure medium to the clutch operating cylinder 4 is not damaged, but, on the other hand, reliably prevents the vehicle from starting up inadvertently because the starting and gear-shift clutch 43 has engaged because of a leak.

As FIG. 1 also shows, the control function can also be triggered if a pressure sensor 47 is used to measure the pressure in the line 48 that leads to the clutch actuation cylinder 4. If this pressure falls below a specified nominal value while the shift valves 14, 15 and 16 are closed, it can be assumed that the clutch will engage inadvertently, for example because of the leak 38. This then causes the control unit 31 to bring the transmission 46 to its neutral position as described.

To achieve this control behavior, the gear operation cylinder is brought by actuation of at least one of the switching valves 17 and/or 18, to such an actuation position (neutral) that the transmission cannot any longer transmit any torque.

The invention is not limited to control devices with pressure-medium-actuated clutch actuators, but includes any control device in which, in relation to its regulating movement, the clutch actuator is not made to be self-locking. Thus, for example, such a clutch actuator could be a non self-locking, electric motor powered spindle drive, such that in the event of a failure or short interruption of the voltage supply to its electric drive motor, there would be a risk that the clutch 43 would be restored in the direction of its engaged position by its clutch-engagement spring 37.

With such electric motor powered or even electromagnetic clutch actuators, application of the method according to the invention results in a desired operating behavior such that the electric or electromagnetic clutch actuation mechanism does not sustain any damage, while at the same time it is ensured that the vehicle will not start off on its own. This is achieved by shifting the transmission to neutral when the defective functioning of a component that is important for keeping the clutch disengaged is found or has already been detected.

INDEXES

1 Clutch and transmission control scheme
2 Clutch actuation block
3 Transmission actuation block
4 Clutch operating cylinder, clutch actuator
5 Piston rod
6 Gate operation cylinder, gate operator
7 Piston rod
8 Gear actuation cylinder, gear actuator
9 Piston rod
10 Hydraulic control device block
11 Electronic control device block
12 Pump
13 Pressure reservoir
14 First 2/2-way valve, clutch
15 Second 2/2-way valve, clutch
16 Third 2/2-way valve, clutch
17 First 3/2-way actuating cylinder, gear
18 Second 3/2-way actuating cylinder, gear
19 Third 3/2-way actuating cylinder, gate
20 Fourth 3/2-way actuating cylinder, gate
21 2/2-way valve, gear
22 Throttle
23 Pressure-limiting valve
24 Tank
25 Path sensor, clutch
26 Path sensor, gear
27 Path sensor, gate
28 Pressure sensor
29 Pressure line
30 Drainage line
31 Control unit
32 Control and sensor lines
33 Speed sensor
34 Sensor lead
35 Device for determining active time
36 Data lead
37 Clutch-engagement spring
38 Leak, leak point
39 Clutch input side
40 Clutch output side
41 Crankshaft
42 Transmission input shaft
43 Clutch, starting and gear-shift clutch
44 Electric motor
45 Internal combustion engine
46 Automatic transmission
47 Pressure sensor
48 Pressure line
49 Pressure space

The invention claimed is:

1. A method for controlling a drivetrain having an automatically shifted starting and gear-shift clutch (43), an automatic transmission (46), a clutch actuator (4) which, in relation to an actuation movement, is not made self-locking, a gear actuator (8) for engaging and disengaging transmission gears, and a control unit (31) which, with information received from sensors and control programs, generates control commands for the clutch actuator (4) and the gear actuator (8) and transmits the control commands to the clutch actuator (4) and the gear actuator (8), the method comprising the steps of:
generating a first control command when a transmission gear is engaged;
sending the first control command to at least one activation mechanism (14) for the clutch actuator (4) to disengage the gear-shift clutch (43);
determining a speed of the vehicle;
if the speed of the vehicle is substantially zero and a start of undesired engagement of the gear-shift clutch (43) is detected, generating a second control command; and
sending the second control command to at least one actuation mechanism (17, 18) of the gear actuator (8) to shift the transmission (46) to a neutral position.

2. The method according to claim 1, further comprising the step of generating the second control command and sending the second control command to the at least one actuation mechanism (17, 18) of the gear actuator (8) to shift the transmission (46) to a neutral position, if a maximum actuation duration of the actuation mechanism (14) of the clutch actuator (4), for disengaging the gear-shift clutch (43), exceeds a specified period of time.

3. The method according to claim 1, further comprising the step of detecting the start of the undesired engagement of the gear-shift clutch (43) by measuring a movement path of a moving portion of the clutch actuator (4).

4. The method according to claim 1, further comprising the step of detecting the start of the undesired engagement of the gear-shift clutch (43) by measuring a pressure drop relative to a nominal pressure in one of a pressure space (49) of a pressure medium actuated clutch actuator (4) and a line (48) leading to the pressure space (49).

5. The method according to claim 4, further comprising the step of detecting the start of an undesired engagement of the gear-shift clutch (43) by measuring a pressure drop in the line (48) leading to one of a clutch cylinder (4) and the pressure space (49), when switching valves (14, 15, 16), which maintain a pressure in the line (48) leading to one of the clutch cylinder (4) and the pressure space (49), is closed and the pressure in the line (48), leading to one of the clutch cylinder (4) and the pressure space (49), drops below a specified nominal pressure value.

6. The method according to claim 1, further comprising the step of detecting the undesired engagement of the gear-shift clutch (43), caused by abnormal operation of at least one of the actuation mechanism (14) of the clutch actuator (4), the clutch actuator (4) and a leak (38), by determining an actuation duration of the actuation mechanism (14).

7. The method according to claim 6, further comprising the step of detecting the undesired engagement of the gear-shift clutch (43) by measuring an actuation duration of one of an electric motor clutch actuator, an electro-mechanical clutch actuator and an electromagnetic clutch actuator (4).

8. The method according to claim 6, further comprising the step of employing a switching valve (14) as the actuation mechanism (14) of the clutch actuator (4).

9. The method according to claim 6, further comprising the steps of:
   comparing the determined actuation duration of the actuation mechanism (14) with a predefined maximum value for the actuation duration; and
   concluding, if the predefined maximum value for the actuation duration is exceeded, that at least one of the actuation mechanism (14) and the clutch actuator (4) is functioning defectively and a pressure line (48) connected to the clutch actuator (4) includes the leak (38).

10. The method according to claim 6, further comprising the step of one of:
   measuring a period of time for which the actuation mechanism (14) of the clutch actuator (4) is active to determine the actuation duration of the actuation mechanism (14) of the clutch actuator (4);
   estimating the period of time for which the actuation mechanism (14) of the clutch actuator (4) is active to determine the actuation duration of the actuation mechanism (14) of the clutch actuator (4); and
   summing time intervals for which the actuation mechanism (14) of the clutch actuator (4) is active to determine the actuation duration of the actuation mechanism (14) of the clutch actuator (4).

11. A method of controlling a drivetrain of a vehicle having an automatically shifted starting and gear-shift clutch (43) and an automatic transmission (46), the method comprising the steps of:
   generating a first control command when a transmission gear is engaged;
   sending the first control command to at least one activation mechanism (14) for the clutch actuator (4) to disengage the gear-shift clutch (43);
   monitoring at least one of a driving speed of the vehicle, actuation of a clutch actuator (4), and actuation of a gear actuator (8) with at least one sensor and control program;
   transmitting information concerning at least one of the driving speed of the vehicle, the actuation of the clutch actuator (4), the actuation of the gear actuator (8) from the at least one of the sensor and the control program to a control unit (31);
   generating a second control command, with the control unit (31), based on the information transmitted from the at least one of the sensor and the control program, if the driving speed of the vehicle is substantially zero and the actuation of the clutch actuator (4) indicates an undesired engagement of the automatically shifted starting and gear-shift clutch (43) is initiated;
   transmitting the second control command from the control unit (31) to a first actuation mechanism (17, 18); and
   actuating the gear actuator (8) with the first actuation mechanism (17, 18), when the first actuation mechanism (17, 18) receives the first control command, causing the gear actuator (8) to shift the automatic transmission (46) into a neutral position.

12. A device for controlling a drivetrain of a vehicle having an engine (45), an automatic transmission (46), and an automatically actuated starting and gear-shift clutch (43) with an input side (39) thereof continuously connected to a crankshaft (41) of the engine (45) and an output side (40) thereof continuously connected to an input shaft (42) of the automatic transmission (46), the device comprising:
   a clutch actuator (4) which, in relation to an actuation movement of clutch actuator (4), is not self-locking;
   a gear actuator (8) for engaging and disengaging transmission gears;
   a control unit (31) which, based upon information received from sensors and control programs, generates control commands for the clutch actuator (4) and the gear actuator (8) and transmits the control commands to the clutch actuator (4) and the gear actuator (8);
   a mechanism (33) for determining a speed of the vehicle; and
   a path sensor (25) and an active time determination device (35) for detecting a start of an undesired engagement of the clutch actuator (4) while a gear is engaged, the path sensor (25) and the active time determination device (35) co-operate with the control unit (31) such that, if the speed of vehicle is substantially zero, the control unit (31) directs an actuation mechanism (17, 18) of the gear actuator (8) to shift the transmission (46) into a neutral position.

13. The device according to claim 12, wherein an actuation mechanism of the clutch actuator (4) comprises one of an electro-mechanical switching valve (14) or an electric motor.

14. The device according to claim 12, further comprising a pressure sensor (47) in communication with the clutch actuation cylinder (4), switching valves (14, 15, 16) in direct fluid communication with the pressure sensor (47), the pressure sensor (47) co-operating with the control unit (31) such that, when all of the switching valves (14, 15, 16) are closed and the pressure sensor (47) detects a drop in pressure below a specified nominal pressure value, if the speed of vehicle is substantially zero, the control unit (31) directs the actuation mechanism (17, 18) of the gear actuator (8) to shift the transmission (46) into the neutral position.

15. The device according to claim 14, wherein the pressure sensor (47) is located in one of a pressure space (49) of a clutch actuation cylinder of the clutch actuator (4) and a pressure line (48) leading to the pressure space (49) of the clutch actuation cylinder of the clutch actuator (4).

16. The device according to claim 15, wherein the pressure line (48) is arranged between at least two switching valves (14, 15, 16) by which the pressure space (49) of the clutch actuation cylinder (4) is one of filled with a pressure medium (switching valve 14) and drained of the pressure medium (switching valve 15, 16).

\* \* \* \* \*